United States Patent [19]

Krohn

[11] 4,146,827

[45] Mar. 27, 1979

[54] FOUR-QUADRANT CURRENT-REGULATED ENERGIZATION OF D.C. MOTOR USING PULSE-WIDTH MODULATION

[75] Inventor: Holger Krohn, Lohr-Wombach, Fed. Rep. of Germany

[73] Assignee: Indramat-Gesellschaft für Industrie-Rationlisierung und Automatisierung mbH, Lohr, Fed. Rep. of Germany

[21] Appl. No.: 856,599

[22] Filed: Dec. 1, 1977

[30] Foreign Application Priority Data

Dec. 4, 1976 [DE] Fed. Rep. of Germany ....... 2655077

[51] Int. Cl.$^2$ ............................................. H02P 7/36
[52] U.S. Cl. .................................. 318/341; 318/332; 318/345 C; 363/136
[58] Field of Search ....................... 363/136, 138, 124; 318/341, 345 C, 332, 293; 361/23, 24, 31; 323/22 SC, 23, 24

[56] References Cited

U.S. PATENT DOCUMENTS

| | | | |
|---|---|---|---|
| 3,624,475 | 11/1971 | Smith | 318/341 |
| 3,735,225 | 5/1973 | Raatz | 318/332 |
| 3,883,786 | 5/1975 | McNaughton et al. | 318/341 |
| 3,942,085 | 3/1976 | Tadakuma et al. | 323/23 |
| 4,037,145 | 7/1977 | Bailey et al. | 318/341 |

*Primary Examiner*—Gerald Goldberg
*Attorney, Agent, or Firm*—Michael J. Striker

[57] ABSTRACT

First and second branches, each containing two thyristors in series, all four thyristors of same polarity, are connected across positive and negative supply lines, in turn connected to positive and negative terminals of D.C. voltage source. D.C. motor connected between junction of two thyristors in one branch and junction of two thyristors in other branch. One pair of diagonally opposite thyristors, or other pair of diagonally opposite thyristors, rendered conductive, for flow of motor current in respective first or second direction. First and second transistors respectively connected in positive and negative supply lines to permit and interrupt thyristor current flow. Selection of a thyristor pair for conduction occurs based on sense of motor-current error. The transistors and selected two thyristors rendered conductive and non-conductive by pulse-width-modulated actuating signal derived from value of motor-current error. During transistor non-conduction intervals, bypass diode network causes current flowing through motor to pass through voltage source in a direction such that voltage source opposes the flow of motor current, irrespective of the motor-current direction.

7 Claims, 1 Drawing Figure

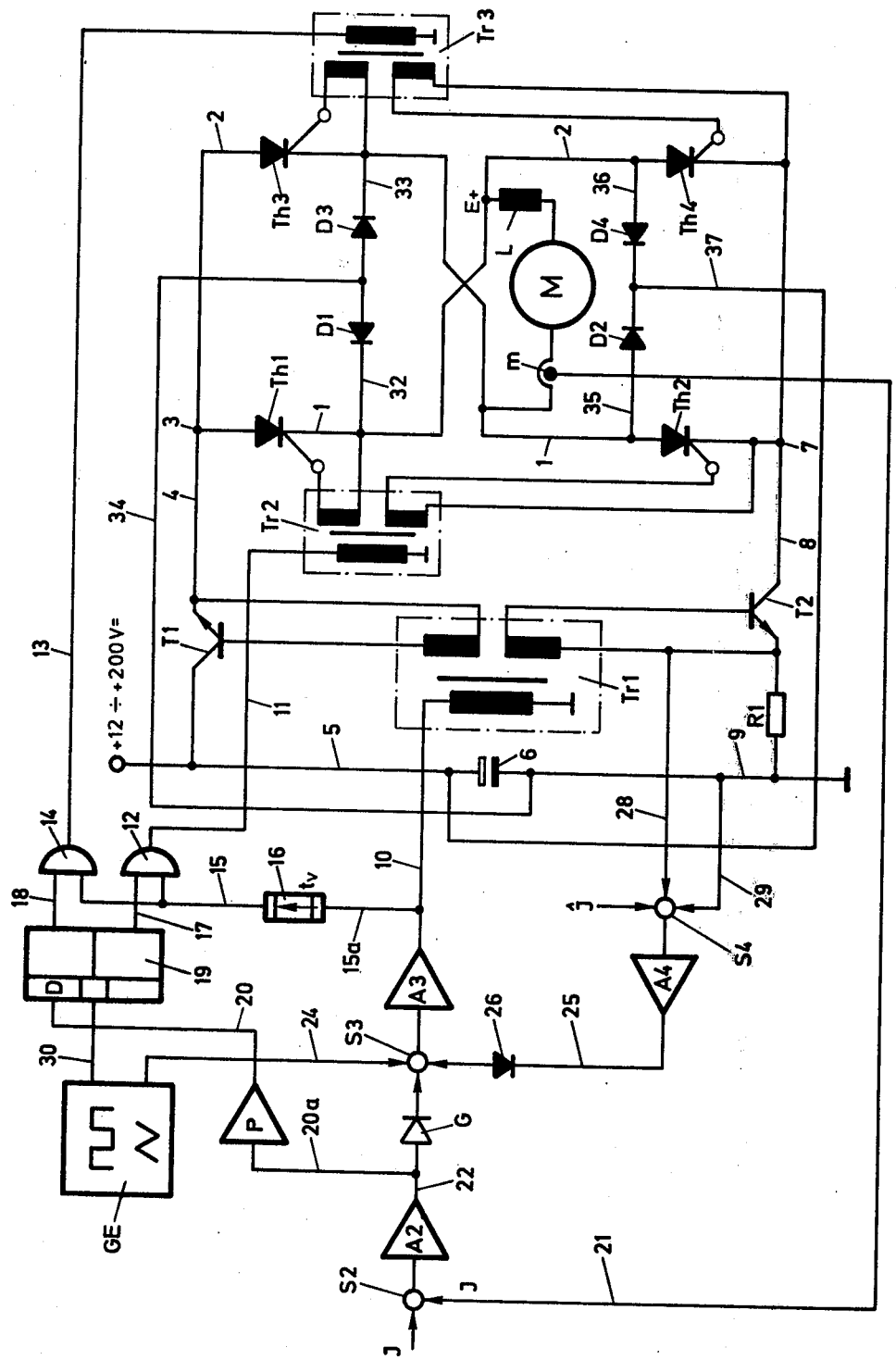

FOUR-QUADRANT CURRENT-REGULATED ENERGIZATION OF D.C. MOTOR USING PULSE-WIDTH MODULATION

BACKGROUND OF THE INVENTION

The invention relates to four-quadrant current-regulated systems using pulse-width modulation, especially for example for the control and current regulation of D.C. motors up to 10 kW. With four-quadrant energization, the motor is connected in the diagonal of a four-switch bridge. To establish motor current in a first or the opposite second direction, one renders conductive one pair of diagonally opposite switches, or else the other pair of diagonally oposite switches. In such circuits, it is known to use either transistors or resettable thyristor valves for the four switches. Resettable thyristor valves are quite expensive, and comprise a plurality of thyristors, capacitors, diodes and chokes, and accordingly these tend only to be used when the power to be handled exceeds the capability of high-power transistors. However, even when less expensive high-power transistors can be used, the cost for these is still quite high.

SUMMARY OF THE INVENTION

It is a general object of the invention to provide a D.C. energized, current-regulated system utilizing pulse-width-modulated energization of the load, the energization being effected using a four-quadrant thyristor bridge which although simpler in configuration than prior-art circuits operates with at least comparable reliability.

In the preferred embodiment, each of the four branches of the energization bridge contains one thyristor. The two ends of the thyristor bridge are connected to the positive and negative terminals of the voltage source through a respective transistor. The first and second, or else the third and fourth thyristor are selected for conduction, depending upon the sense of the motor-current error. The two transistors and the selected two thyristors are rendered conductive and non-conductive by a pulse-width-modulated activating signal derived from the value of the motor-current error. During the non-conduction intervals of the two transistors, current flow through the selected two thyristors, and indeed through the other two as well, is precluded. However, due to load inductance, including for example a choke connected in series with the motor, motor current continues to flow. During the transistor non-conduction intervals, this current, irrespective of its direction, is routed by a diode network into and through the D.C. voltage source, and in such a direction through the source that the source opposes this flow of motor current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts an exemplary circuit embodying the inventive concepts.

DESCRIPTION OF THE PREFERRED EMBODIMENTS

The four-quadrant current-regulation circuit depicted in the FIGURE comprises two bridge branches 1, 2. Branch 1 contains thyristors Th1 and Th2; branch 2 contains thyristors Th3 and Th4. Connected in both bridge branches 1, 2 is the series combination of a D.C. machine M to be controlled and a choke inductor L. The anode ends of the two bridge branches 1, 2 are connected from a junction point 3, via a line 4 and a transistor T1, to the positive current line 5 of a D.C. voltage source 6. The cathode ends of the two bridge branches 1, 2 are connected from a junction point 7, via a line 8, transistor T2 and a resistor R1, to the negative current path 9 of the D.C. voltage source 6.

The transistors T1, T2 can be rendered conductive simultaneously by a transformer Tr1. The thyristors Th1, Th2 in bridge branch 1 can be rendered conductive simultaneously by a transformer Tr2. The thyristors Th3, Th4 in bridge branch 2 can be rendered conductive simultaneously by a transformer Tr3.

The primary winding of transformer Tr1 is connected via a line 10 to the output of a comparator A3. The primary winding of transformer Tr2 is connected via a line 11 to the output of an AND-gate 12. The primary winding of transformer Tr3 is connected via a line 13 to the output of an AND-gate 14. The lower inputs of AND-gates 12, 14 are connected via a line 15 to the output of a time-delay stage 16, whose input is connected via a line 15a to the output of comparator A3. The upper inputs of AND-gates 12, 14 are connected to respective ones of the two outputs of a D-flip-flop 19. The information input of the D-flip-flop 19 is connected via a line 20 to the output of a polarity detector P, whose input is connected via a line 20a to the output of a current regulator A2.

Current regulator A2, at its summing junction S2, receives a desired-value signal $J_{soll}$, the polarity and value of which are respectively indicative of the desired direction and magnitude for the current flow to be established through motor M. Summing junction S2 also receives a feedback signal $J_{ist}$, the polarity and value of which respectively indicate the actual direction and actual magnitude of the current flowing through motor M. Feedback signal $J_{ist}$ is furnished to summing junction S2 via a line 21 from a current-measuring unit m operative for sensing the current flowing through the current path of the D.C. machine M. The signal at the output line 22 of current regulator A2 is an error signal, whose magnitude indicates the amount of the discrepancy between the desired and actual magnitude of motor current, and whose polarity indicates the sense of this error.

The signal on the output line 22 of current regulator A2 is transmitted via line 20a to the input of polarity detector P, and via a rectifier G to the summing junction S3 of comparator A3. The summing junction S3 additionally receives a triangular waveform from a waveform generator GE, via a line 24. Also, summing junction S3 can receive, via a line 25 containing a diode 26, a negative blocking signal; when the maximum permissible level of current flowing in the current paths 1, 2 is exceeded, the effect of this blocking signal is to interrupt current flow by rendering non-conductive the transistors T1, T2, and thereby also the thyristors Th1–Th4. This blocking signal is the output signal of a comparator A4. The summing junction S4 of comparator A4 receives a maximum-permissible-current signal $J$, and also an actual-current signal tapped off the two ends of resistor R1 via lines 28, 29.

The D-flip-flop 19 receives its clock signals via a clock-signal line 30 from the output of waveform generator GE. As graphically indicated within the box representing waveform generator GE, the waveform produced at its upper output is rectangular, and that at its lower output triangular. Moreover, it will be noted that the rise and fall of the triangular output waveform and the high and low values of the rectangular output waveform are synchronized. Thus, the D-flip-flop 19 can be clocked only at the moments when the triangular waveform is at its zero level.

The two bridge-branch input thyristors Th1, Th3 are connected at their cathodes, via lines 32, 33, to the cathodes of respective freewheeling-current diodes D1, D3, the anodes of which are connected in common, via a line 34, to the negative line 9 of the D.C. voltage source 6; similarly, the anodes of output thyristors Th2, Th4 are connected, via lines 35, 36, to the anodes of respective freewheeling-current diodes D2, D4, the cathodes of which are connected in common, via a line 37, to the positive line 5 of D.C. voltage source 6.

The operation of the illustrated, exemplary circuit is as follows:

The polarity of the desired-current signal $J_{soll}$ applied to the summing junction S2 of current regulator A2 determines the direction of current flow to be established through motor M. The polarity of the error signal produced on output line 22 of current regulator A2 is detected by polarity detector P. Depending upon the polarity of the error signal, the polarity detector P readies the D-flip-flop 19 for assumption of one or the other of its two states. Depending upon which flip-flop state is ready to be assumed, the clock signals furnished by waveform generator GE are transmitted to the flip-flop output line 17, or to the flip-flop output line 18, and thereby either to the upper input of AND-gate 12 or to the upper input of AND-gate 14. This occurs on the basis of the polarity of the error signal appearing at current-regulator output line 22.

Additionally, the error signal on current-regulator output line 22 is rectified by rectifier G and applied to the summing junction S3 of comparator A3. The rectified error signal is compared against the instantaneous value of the triangular waveform furnished by waveform generator GE. Persons skilled in the art will understand that the signal produced at the output of comparator A3 constitutes a pulse-width-modulated signal, whose pulse width is proportional to the absolute value of the error signal produced at the output line 22 of the current regulator A2. This pulse-width-modulated signal is utilized to control switching operations. Specifically, this pulse-width-modulated signal is applied to the primary winding of transformer Tr1, and via the two secondary windings thereof, to the base-emitter junctions of transistors T1, T2, rendering these conductive. Additionally, the pulse-width-modulated output signal of comparator A3 is transmitted, through the time-delay stage 16 with a time delay $t_v$, to the lower inputs of the two AND-gates 12, 14. Depending upon which of these two AND-gates is in enabled condition, the time-delayed pulse-width-modulated signal is transmitted to the primary winding of either transformer Tr2 or transformer Tr3. The pulse-width-modulated signal is then transmitted from the affected one of the transformers Tr2, Tr3 to the gate-cathode paths of the thyristors Th1, Th2, or else of thyristors Th3, Th4, thereby firing the two thyristors in either one or the other of the two bridge branches 1 and 2.

Because of the firing of the relevant thyristor pair after the elapse of a time delay subsequent to the rendering conductive of the two transistors T1, T2, no switch-on losses are attached to the switch-on of the transistors. Of the losses characteristic of pure transistor-bridge circuits, the only losses remaining are switch-off losses. Accordingly, the inventive circuit concept makes better use of the transistors than can be done in a transistor-bridge circuit.

The synchronization between the clocking of D-flip-flop 19 and the generation of the triangular waveform by waveform generator GE establishes an advantageous interlock effect. If one thyristor pair has been fired, and then the other thyristor pair is to be fired, the switchover to firing of the other thyristor pair can only occur during the non-conduction interval of the transistors. I.e., because the triggering flanks of the rectangular pulses produced by waveform generator GE are synchronized with the zero-level value of the triangular waveform, clocking of the flip-flop D, and therefore the possibility of a switchover from one thyristor pair to the other, will occur only during the time interval intermediate two successive pulses of the pulse-width-modulated output signal of comparator A3. Persons skilled in the art, and familiar with the pulse-width-modulation technique in question, will understand that the leading flank of a pulse-width-modulated pulse is formed when the values of the rectified error signal and of the triangular waveform applied to summing junction S3 coincide identically, or assume another predetermined relationship, and likewise for the generation of the trailing flank of each such pulse-width-modulated pulse. It is for this reason that the clocking of flip-flop 19 can occur only during the non-conduction times of transistors T1, T2. In the exemplary embodiment, it is assumed that the triggering flanks of the rectangular waveform generated by waveform generator GE are coincident with the zero-level values of the triangular waveform; however, persons skilled in the art will appreciate that the synchronization could be somewhat different, e.g., somewhat offset or the like. In any event, the interlock effect in question precludes the short-circuiting effects which could arise if all four thyristors happened to be fired together.

When the pulse-width-modulated pulse which has rendered conductive the transistors T1, T2 and fired the relevant thyristor pair comes to an end, the transistors T1, T2 become non-conductive. Accordingly, the current paths 4 and 8 leading to and from the bridge branches 1 and 2 are interrupted. Depending upon the direction of motor current just prior to this current-path interruption, the current still flowing in choke inductor L flows through a closed circuit comprised of L, M, D2, 6 and D1, or else through a closed circuit comprised of L, D4, 6, D3 and M; i.e., this freewheeling current is carried either by the freewheeling-diode pair D1, D2 or else by the freewheeling-diode pair D3, D4. This freewheeling current bypasses the transistors and thyristors, and accordingly the conductive thyristor pair becomes non-conductive.

The next pulse-width-modulated pulse at the output of comparator A3 starts the energization cycle anew.

As already mentioned, the direction and magnitude of the motor current is detected at measuring location m, and a corresponding feedback signal $J_{ist}$ transmitted to the summing junction S2 of current regulator A2. The difference between the desired-current and actual-current signals $J_{soll}$ and $J_{ist}$ constitutes the output error signal of current regulator A2. This signal, after rectification by rectifier G, is applied to the comparator A3, for the formation of a corresponding pulse-width-modulated actuating signal for the conductivity control of the transistors and thyristors. When the polarity of the error signal at output line 22 of current regulator A2 changes, the polarity detector P causes the flip-flop 19 to change state, so that during the next conduction time interval of the transistors it will be the respective other pair of the thyristor pairs which is fired. Accordingly, during such next energization cycle, the thyristors will reverse the polarity of the voltage applied to motor M and inductor L, causing the motor current to begin to change in a sense correcting the motor-current error.

As already noted, during the non-conduction time of transistors T1, T2, the freewheeling motor current flows either through a closed path M, L, D1, D2, 6 or through a closed path M, L, D3, D4, 6. In either case, the voltage of D.C. voltage source 6 opposes the freewheeling motor current, i.e., tending to reduce it, and current is returned to the voltage source. Thus, the controllability of the duration and polarity of the voltage applied across motor M and inductor L per energization cycle, in conjunction with the positive application of reverse voltage across the motor M and inductor L during the non-conduction time of the transistors during the energization cycle, makes the polarity and magnitude control capable of establishing any desired average value of applied voltage, up to the limit of the voltage source.

This makes it possible to regulate (i.e., by negative-feedback action) the direction and magnitude of the motor current, with complete disregard for whether the motor happens to be operating as a generator (i.e., its EMF contributing to the current flow which the system is trying to establish) or happens to be operating as a motor (i.e., its EMF opposing the current flow which the system is trying to establish).

The inductance of inductor L should be selected in dependence upon the clocking frequency established by waveform generator GE, such that the amount by which the motor current can change per energization cycle is small in comparison to the rated current of the motor. Persons skilled in the art will understand that, as a result, the current flowing through the motor will be a nearly smooth direct current, despite the pulsewise application of drive voltage across the motor. If the system is to be capable of implementing very quick changes in motor current, then this should be implemented by selection of a high clocking frequency for the waveform generator 30, for example about 1250 Hz.

It will be understood that each of the elements described above, or two or more together, may also find a useful application in other types of circuit configurations differing from the types described above.

While the invention has been illustrated and described as embodied in a circuit wherein the subfunctions attendant to the desired current regulation, such as the pulse-width-modulation, are implemented in a particular manner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A current-regulated system comprising, in combination; a D.C. voltage source having a first and a second terminal; a first and a second current supply line respectively connected to the first and second terminal; an inductive load having two terminals; a four-quadrant energizing circuit for the load, comprising a first thyristor connecting the first load terminal to the first supply line, a second thyristor connecting the second load terminal to the second supply line, the polarities of the first and second thyristors being such that when both are conductive they establish a current path for current flow through the load in a first direction, a third thyristor connecting the second load terminal to the first supply line, and a fourth thyristor connecting the first load terminal to the second supply line, the polarities of the third and fourth thyristors being such that when both are conductive they establish a current path for current flow through the load in an opposite second direction; a first transistor connected in the first supply line between the first source terminal and the first and third thyristors; a second transistor connected in the second supply line between the second source terminal and the second and fourth thyristors; negative-feedback current-regulating means regulating the current flowing through the load, including means for generating an error signal indicative of the sense and magnitude of the difference between the actual current flowing through the load and a desired current to be caused to flow through the load, means operative in dependence upon the sense of the difference indicated by the error signal for selecting either the first and second or else the third and fourth thyristors for conduction, means operative for deriving from the error signal an actuating signal which is pulse-width-modulated in dependence upon the magnitude of the difference indicated by the error signal, and means operative in dependence upon the pulse duration and interpulse duration of the actuating signal for rendering alternately conductive and non-conductive the two transistors and the selected two thyristors; and bypass circuit means operative during the non-conduction time intervals of the transistors for diverting current flowing through the inductive load into and through the voltage source without passing through the transistors or the thyristors and in such a direction through the voltage source that the latter opposes this flow of current through the load.

2. The system defined in claim 1, the bypass means including at least one first diode connecting the inductive load to the voltage source and having a polarity constraining current flowing through the load in a first direction to flow through the voltage source in a direction such that the voltage source opposes current flow through the load in the first direction, and at least one second diode connecting the inductive load to the voltage source and having a polarity constraining current flowing through the load in the opposite second direction to flow through the voltage source in a direction such that the voltage source opposes current flow through the load in the second direction.

3. The system defined in claim 1, the means for rendering alternately conductive and non-conductive the two transistors and the selected two thyristors comprising means operative for firing the selected two thyristors after the elapse of a predetermined time delay subsequent to rendering conductive the two transistors.

4. The system defined in claim 1, the means selecting either the first and second or else the third and fourth thyristors for conduction comprising means operative for preventing a change of selection except during the non-conduction time intervals of the two transistors.

5. The system defined in claim 1, the bypass circuit means comprising a first and a second diode having cathodes connected to respective ones of the two load terminals and having anodes both connected to the second current supply line, and a second and a third diode having anodes connected to respective ones of the two load terminals and having cathodes both connected to the first current supply line.

6. The system defined in claim 1, the means for deriving the pulse-width-modulated actuating signal comprising means generating a triangular-waveform signal, a comparator connected to receive the triangular-waveform signal and connected to receive the error signal and operative for producing at the output of the comparator the pulse-width-modulated actuating signal, the means for selecting either the first and second or else the third and fourth thyristors for conduction comprising a first AND-gate, a second AND-gate, a D-flip-flop having two outputs each connected to an input of a respective one of the AND-gates and having a clock input and a state-control input, a polarity detector having an input connected to receive the error signal and having an output connected to the state-control input, means for clocking the D-flip-flop in synchronism with the triangular-waveform signal, means connecting the output of the first AND-gate to the control electrodes of the first and second thyristors, and means connecting the output of the second AND-gate to the control electrodes of the third and fourth thyristors, the means for rendering alternately conductive and non-conductive the two transistors and the selected two thyristors comprising time-delay means having an input connected to receive the pulse-width-modulated actuating signal and having an output connected to a second input of the first AND-gate and to a second input of the second AND-gate.

7. The system defined in claim 1, the inductive load comprising a D.C. motor.

* * * * *